United States Patent
Chen et al.

(10) Patent No.: US 9,627,987 B2
(45) Date of Patent: Apr. 18, 2017

(54) FLYBACK CONVERTER OPERATING BY SYNCHRONOUS RECTIFICATION WITH TRANSIENT PROTECTION, PRIMARY SIDE CONTROL CIRCUIT THEREIN, AND CONTROL METHOD THEREOF

(71) Applicant: RICHTEK TECHNOLOGY CORPORATION, Zhubei, HsinChu (TW)

(72) Inventors: Yu-Kai Chen, Tainan (TW); Hsin-Yi Wu, Taipei (TW); Tzu-Chen Lin, Changhua (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 14/960,403

(22) Filed: Dec. 6, 2015

(65) Prior Publication Data
US 2016/0172962 A1    Jun. 16, 2016

Related U.S. Application Data

(60) Provisional application No. 62/091,490, filed on Dec. 13, 2014.

(51) Int. Cl.
*H02M 1/16*     (2006.01)
*H02M 3/335*    (2006.01)
*H02M 1/32*     (2007.01)
*H02M 1/00*     (2006.01)

(52) U.S. Cl.
CPC ......... *H02M 3/33592* (2013.01); *H02M 1/32* (2013.01); *H02M 2001/0012* (2013.01); *Y02B 70/1475* (2013.01)

(58) Field of Classification Search
CPC ......... H02M 3/33507; H02M 3/33523; H02M 3/33561; H02M 3/33569; H02M 3/33592; H02M 1/16; H02M 1/36; H02M 2001/0032; Y02B 70/1433; Y02B 70/1475
USPC ...................................... 363/21.14
See application file for complete search history.

(56) References Cited

U.S. PATENT DOCUMENTS

| | | | |
|---|---|---|---|
| 7,889,521 B2* | 2/2011 | Hsu ............... | H02M 3/33592 |
| | | | 363/21.14 |
| 8,699,243 B2* | 4/2014 | Sims .............. | H02M 3/33592 |
| | | | 363/21.14 |
| 9,287,793 B2* | 3/2016 | Zhang ............. | H02M 3/33592 |
| 9,312,777 B2* | 4/2016 | Lefedjiev ......... | H02M 3/33523 |

(Continued)

*Primary Examiner* — Yemane Mehari
(74) *Attorney, Agent, or Firm* — Tung & Associates

(57) ABSTRACT

The present invention discloses a flyback converter, a primary side control circuit therein, and a control method thereof. The flyback converter includes: a transformer circuit, a power switch circuit, a primary side control circuit, a synchronous rectification (SR) switch, and a synchronous rectification (SR) control circuit. When a feedback signal indicates that a difference between a target output voltage and an actual output voltage increases, the primary side control circuit increases an operation frequency of an operation signal by step-wisely reducing a cycle period of the operation signal in response to the increase of the difference, wherein the cycle period of the operation signal is reduced by a predetermined unit of time in each step, such that the cycle period of the operation signal is a step function of the increase of the difference.

18 Claims, 4 Drawing Sheets

(56) References Cited

U.S. PATENT DOCUMENTS

| | | | |
|---|---|---|---|
| 9,374,011 B2* | 6/2016 | Liu | H02M 3/33592 |
| 2012/0176816 A1* | 7/2012 | Seel | H02M 1/36 |
| | | | 363/21.01 |
| 2015/0280573 A1* | 10/2015 | Gong | H02M 3/33523 |
| | | | 363/21.14 |

* cited by examiner

FLYBACK CONVERTER OPERATING BY SYNCHRONOUS RECTIFICATION WITH TRANSIENT PROTECTION, PRIMARY SIDE CONTROL CIRCUIT THEREIN, AND CONTROL METHOD THEREOF

CROSS REFERENCE

The present invention claims priority to U.S. 62/091,490, filed on Dec. 13, 2014.

BACKGROUND OF THE INVENTION

Field of Invention

The present invention relates to a flyback converter, a primary side control circuit therein, and a control method thereof; particularly, it relates to such a flyback converter operating by synchronous rectification with a proper transient protection, and a primary side control circuit therein and a control method thereof.

Description of Related Art

FIGS. 1A-1C show schematic diagrams of a conventional flyback converter 100 with synchronous rectification, signal waveforms showing a synchronous rectification mechanism, and signal waveforms showing a phase-locked loop (PLL) protection mechanism, respectively. As shown in FIG. 1A, a rectifier circuit 101 rectifies an alternating current (AC) voltage Vac to generate an input voltage Vin. The rectifier circuit 101 is for example a bridge rectifier circuit. A transformer circuit 102 of the flyback converter 100 receives the input voltage Vin, and converts it to the output voltage Vout. The flyback converter 100 includes the aforementioned transformer circuit 102, a power switch circuit 103, an opto-coupler circuit 104, a primary side control circuit 105, a current sense circuit 106, a synchronous rectification (SR) control circuit 107, and an SR switch circuit 108. The primary side control circuit 105 generates an operation signal GATE according to a current sense signal CS generated by the current sense circuit 106 and a feedback signal COMP generated by the opto-coupler circuit 104; the operation signal GATE controls a power switch SW of the power switch circuit 103 to convert the input voltage Vin to the output voltage Vout. The transformer circuit 102 includes a primary winding W1 and a secondary winding W2. The secondary winding W2 is electrically connected to a ground level GND, and the primary winding W1 is electrically connected to a reference level REF. The current sense circuit 106 generates the current sense signal CS according to a power switch current flowing through the power switch SW of the power switch circuit 103.

FIG. 1B shows a condition that the flyback converter 100 operating with a voltage-second balance mechanism is in a steady state. "Steady state" means that the output voltage Vout is stably regulated at a target voltage. In the steady state, an average of an inductor voltage VLm across an inductor Lm in the transformer circuit 102 is zero during a cycle period. That is, the product of voltage and time during the period when the power switch SW is ON, i.e., a product of a voltage Vin' of the inductor voltage VLm and an ON time period tON, is equal to the product of voltage and time during the period when the power switch SW is OFF, i.e., a product of a voltage nVout' of the inductor voltage VLm and an OFF time period tOFF, which is the "voltage-second balance".

In order to turn ON and OFF the SR power switch SWsr in the SR switch circuit at correct timings, an internal capacitor Ct is provided in the SR control circuit 107, which is charged and discharged according to the switching timings of the operation signal GATE. More specifically, a voltage Vct of an internal capacitor Ct is controlled to follow an inductor current ILm flowing through the inductor Lm of the transformer circuit 102. As shown in FIG. 1C, when the operation signal GATE is at a high level, the power switch SW is turned ON, whereas the SR power switch SWsr in the SR switch circuit 108 is turned OFF, so there is a voltage difference between the drain and source of the SR power switch SWsr and the drain voltage Vdsr of the power switch SWsr is high, and thus the internal capacitor Ct is charged. When the operation signal GATE is at a low level, the primary side power switch SW is turned OFF, but the current flowing through the inductor Lm is not zero, and thus it transfers energy to the secondary winding W2, and the parasitic diode Dsr in the SR switch circuit 108 is turned ON, and the drain voltage Vdsr is low. When the SR control circuit 107 detects that the drain voltage Vdsr switches from the high level to the low level, the SR control circuit 107 turns ON the SR power switch SWsr, and the internal capacitor Ct is discharged. When the capacitor voltage Vct decreases to 0V, the SR control circuit 107 turns OFF the SR power switch SWsr, whereby a synchronous rectification function is achieved, i.e., the period that the secondary side is conductive is synchronous with the period that the primary side is not conductive. The components in the SR control circuit 107 which control the charging and discharging currents of the internal capacitor Ct and the components in the SR control circuit 107 which generate the switch control signal for controlling the SR power switch SWsr are omitted for simplicity of the drawing.

The voltage-second balance mechanism is only achieved at the steady state. When the flyback converter 100 operates in a transient state, such as during a transient period wherein the frequency is increased, the flyback converter 100 is not operating under the voltage-second balance mechanism. In this case, the flyback converter 100 operates in a continuous conduction mode (CCM), wherein the internal capacitor Ct may not be discharged to 0V before the operation signal GATE switches to the high level, such that the SR control circuit 107 may not turn OFF the SR power switch SWsr in time. There is a very high risk that the primary side power switch SW and the SR power switch SWsr may be both conductive at the same time to cause a system crash.

To avoid the system crash, a phase-locked loop (PLL) protection mechanism is adopted in the secondary side SR control circuit 107 to limit a maximum ON time the SR power switch SWsr. Please refer to FIG. 1C. The PLL protection mechanism detects the drain voltage Vdsr of the SR power switch SWsr to obtain a previous cycle period ts_pri[n−1]. In the next (i.e., present) cycle period ts_pri[n], the SR control circuit 107 counts time from the beginning of the cycle period. When the time count reaches the previous cycle period ts_pri[n−1] minus a predetermined dead time tdead (i.e., the period ts_sec[n]), and if the internal capacitor Ct is not discharged to 0V yet, the SR control circuit 107 forces the SR power switch SWsr to turn OFF, so as to ensure that the flyback converter 100 operates safely from the system crash.

Obviously, for safety, the dead time tdead can not be set too short. However, if the dead time tdead is set too long, the SR power switch SWsr will be turned OFF too early and the flyback converter 100 will have a low efficiency. Hence, the stability and the efficiency of the flyback converter 100 become a trade-off. In addition, even if the dead time is set to an optimum value, it still does not completely solve the problem. When the flyback converter 100 operates in a transient period wherein the frequency is increased, i.e., the operation frequency of the operation signal GATE keeps increasing, the present cycle period ts_pri[n] may be shorter than the previous switching period ts_pri[n−1] minus the predetermined dead time tdead, i.e., $$ts\_pri[n] < ts\_pri[n-1] - tdead = ts\_sec[n],$$

and under such circumstance, the PLL protection mechanism fails to protect the system from crash.

In view of the above, the present invention proposes a flyback converter operating by synchronous rectification with a proper transient protection, a primary side control circuit therein, and a control method thereof.

SUMMARY OF THE INVENTION

From one perspective, the present invention provides a flyback converter, comprising: a transformer circuit, which includes: a primary winding, configured to operably receive an input voltage; and a secondary winding, configured to operably generate an output voltage at an output node, and to operably generate a synchronous voltage at a synchronous node; a power switch circuit, which is coupled to the primary winding, and configured to operably control a power switch therein according to an operation signal, so as to convert the input voltage to the output voltage; a primary side control circuit, which is coupled to the power switch circuit, and configured to operably generate the operation signal according to a current sense signal and a feedback signal, wherein the current sense signal is related to a current flowing through the power switch; a synchronous rectification (SR) switch, which is coupled to the secondary winding, and controlled by a synchronous rectification (SR) signal; and a synchronous rectification (SR) control circuit, which is coupled to the secondary winding and the SR switch, and configured to operably generate the feedback signal according to the output voltage and to operably generate the SR signal and the synchronous voltage, respectively; wherein when the feedback signal indicates that a difference between a target output voltage and an actual output voltage increases, the primary side control circuit increases an operation frequency of the operation signal by step-wisely reducing a cycle period of the operation signal in response to the increase of the difference, wherein the cycle period of the operation signal is reduced by a predetermined unit of time in each step, such that the cycle period of the operation signal is a step function of the increase of the difference.

In one preferable embodiment, the primary side control circuit includes: an oscillator circuit, which is coupled to the SR control circuit, and configured to operably generate a first clock signal according to the feedback signal; a sample-and-hold circuit, which is configured to operably generate a sample-and-hold signal according to a setting signal; a subtract circuit, which is coupled to the sample-and-hold circuit, and configured to operably generate a second clock signal by subtracting the predetermined unit of time from the cycle period of the sample-and-hold signal; and a logic circuit, which is coupled to the oscillator circuit and the subtract circuit, and configured to operably generate the setting signal according to the first clock signal and the second clock signal, whereby a timing of the setting signal is determined by one of the first clock signal and the second clock signal which has a longer cycle period than the other; wherein a starting time of the cycle period of the operation signal is determined according to the setting signal.

In one embodiment, the primary side control circuit preferably further includes: a comparison circuit, which is configured to operably compare the current sense signal with the feedback signal to generate the resetting signal; and a flip-flop circuit, which is coupled to the logic circuit and the comparison circuit, and configured to operably generate the operation signal according to the setting signal and the resetting signal.

In one preferable embodiment, the sample-and-hold signal is generated by sampling-and-holding the setting signal from a rising edge to a next rising edge.

In one preferable embodiment, the logic circuit includes: a latch circuit, which is coupled to the oscillator circuit and the subtract circuit, and configured to operably generate a first latch signal according to the first clock signal and a second latch signal according to the second clock signal, respectively; and a logic operation circuit, which is coupled to the latch circuit, and configured to operably perform a logic operation of the first latch signal and the second latch signal to generate the setting signal.

In one preferable embodiment, a dead time is set, the dead time being a minimum time from when the SR switch is forced OFF to an end of the cycle period of the operation signal, and the predetermined unit of time is not longer than the dead time.

From another perspective, the present invention provides a primary side control circuit in a flyback converter, wherein the flyback converter includes: a transformer circuit, which includes: a primary winding, configured to operably receive an input voltage; and a secondary winding, configured to operably generate an output voltage at an output node, and a synchronous voltage at a synchronous node; a power switch circuit, which is coupled to the primary winding, and configured to operably control a power switch therein according to an operation signal, so as to convert the input voltage to the output voltage; the primary side control circuit, which is coupled to the power switch circuit, and configured to operably generate the operation signal according to a current sense signal and a feedback signal, wherein the current sense signal is related to a current flowing through the power switch; a synchronous rectification (SR) switch, which is coupled to the secondary winding, and controlled by a synchronous rectification (SR) signal; and a synchronous rectification (SR) control circuit, which is coupled to the secondary winding and the SR switch, and configured to operably generate the feedback signal according to the output voltage and to operably generate the SR signal and the synchronous voltage, respectively; wherein when the feedback signal indicates that a difference between a target output voltage and an actual output voltage increases, the primary side control circuit increases an operation frequency of the operation signal by step-wisely reducing a cycle period of the operation signal in response to the increase of the difference, wherein the cycle period of the operation signal is reduced by a predetermined unit of time in each step, such that the cycle period of the operation signal is a step function of the increase of the difference; the primary side control circuit comprising: an oscillator circuit, which is coupled to the SR control circuit, and configured to operably generate a first clock signal according to the feedback signal; a sample-and-hold circuit, which is configured to operably generate a sample-and-hold signal according to a setting signal; a subtract circuit, which is coupled to the sample-and-hold circuit, and configured to operably generate a second clock signal by subtracting the predetermined unit of time from the cycle period of the sample-and-hold signal; and a logic circuit, which is coupled to the oscillator circuit and the subtract circuit, and configured to operably generate the setting signal according to the first clock signal and the second clock signal, whereby a timing of the setting signal switching from an inactive level to an active level is determined by one of the first clock signal and the second clock signal which has a longer cycle period than the other; wherein a starting time of the cycle period of the operation signal is determined according to the setting signal.

In one preferable embodiment, the primary side control circuit further includes: a comparison circuit, which is configured to operably compare the current sense signal with the feedback signal to generate a resetting signal; and a flip-flop circuit, which is coupled to the logic circuit and the comparison circuit, and configured to operably generate the operation signal according to the setting signal and the resetting signal.

In one preferable embodiment, the sample-and-hold signal is generated by sampling-and-holding the setting signal from a rising edge to a next rising edge.

In one preferable embodiment, the oscillator circuit includes a voltage-controlled oscillator.

In one preferable embodiment, the logic circuit includes: a latch circuit, which is coupled to the oscillator circuit and the subtract circuit, and configured to operably generate a first latch signal according to the first clock signal and a second latch signal according to the second clock signal, respectively; and a logic operation circuit, which is coupled to the latch circuit, and configured to operably perform a logic operation of the first latch signal and the second latch signal to generate the setting signal.

In one preferable embodiment, a dead time is set, the dead time being a minimum time from when the SR switch is forced OFF to an end of the cycle period of the operation signal, and the predetermined unit of time is not longer than the dead time.

From another perspective, the present invention provides a control method of a flyback converter, the control method comprising: operating a power switch according to an operation signal, to convert an input voltage to an output voltage; generating the operation signal according to a current sense signal and a feedback signal, wherein the current sense signal is related to a current flowing through the power switch; operating a synchronous rectification (SR) switch according to a synchronous rectification (SR) signal; generating the feedback signal according to the output voltage; generating the synchronous voltage according to the SR signal; and when the feedback signal indicates that a difference between a target output voltage and an actual output voltage increases, increasing an operation frequency of the operation signal by step-wisely reducing a cycle period of the operation signal in response to the increase of the difference, wherein the cycle period of the operation signal is reduced by a predetermined unit of time in each step, such that the cycle period of the operation signal is a step function of the increase of the difference.

In one preferable embodiment, the step of generating the operation signal according to a current sense signal and a feedback signal, includes: generating a first clock signal according to the feedback signal; generating a sample-and-hold signal according to a setting signal; generating a second clock signal by subtracting the predetermined unit of time from the cycle period of the sample-and-hold signal; generating the setting signal according to the first clock signal and the second clock signal, whereby a timing of the setting signal switching from an inactive level to an active level is determined by one of the first clock signal and the second clock signal which has a longer cycle period than the other; and determining a starting time of the cycle period of the operation signal according to the setting signal.

In one embodiment, the step of generating the operation signal according to a current sense signal and a feedback signal, preferably further includes: comparing the current sense signal with the feedback signal to generate a resetting signal; and generating the operation signal according to the setting signal and the resetting signal.

In one preferable embodiment, the step of generating the sample-and-hold signal includes: sampling-and-holding the setting signal from a rising edge to a next rising edge to generate the sample-and-hold signal.

In one preferable embodiment, the step of generating the setting signal includes: generating a first latch signal according to the first clock signal and generating a second latch signal according to the second clock signal, respectively; and performing a logic operation of the first latch signal and the second latch signal to generate the setting signal.

In one preferable embodiment, a dead time is set, the dead time being a minimum time from when the SR switch is forced OFF to an end of the cycle period of the operation signal, and the predetermined unit of time is not longer than the dead time.

The objectives, technical details, features, and effects of the present invention will be better understood with regard to the detailed description of the embodiments below.

DESCRIPTION OF THE PREFERRED EMBODIMENTS

In the following description, for simplicity, it is assumed that the high level of a digital signal means active and the low level of a digital signal means inactive. However, the meanings of high and low levels of a digital signal are interchangeable, and corresponding modifications can be made on the circuits processing this signal or controlled by this signal, which is well-known by one skilled in this art.

Figure 2A:
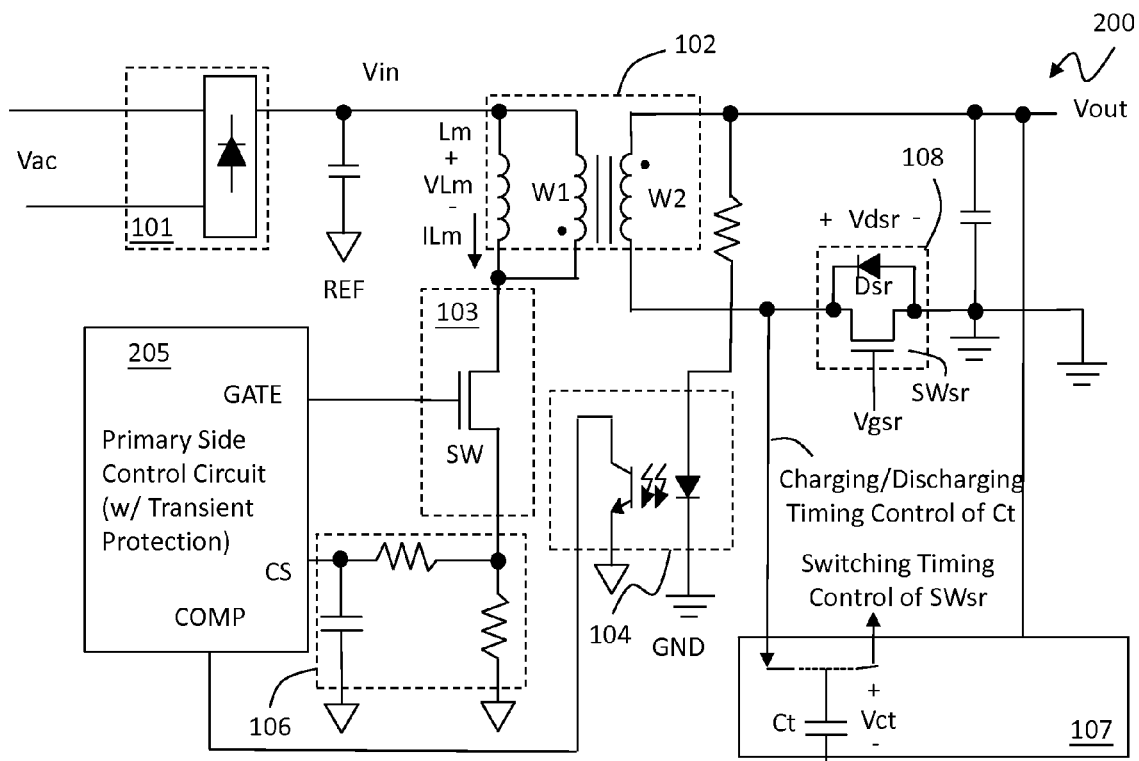
FIGS. 2A and 2B show a first embodiment of the present invention.
Figure 2B:
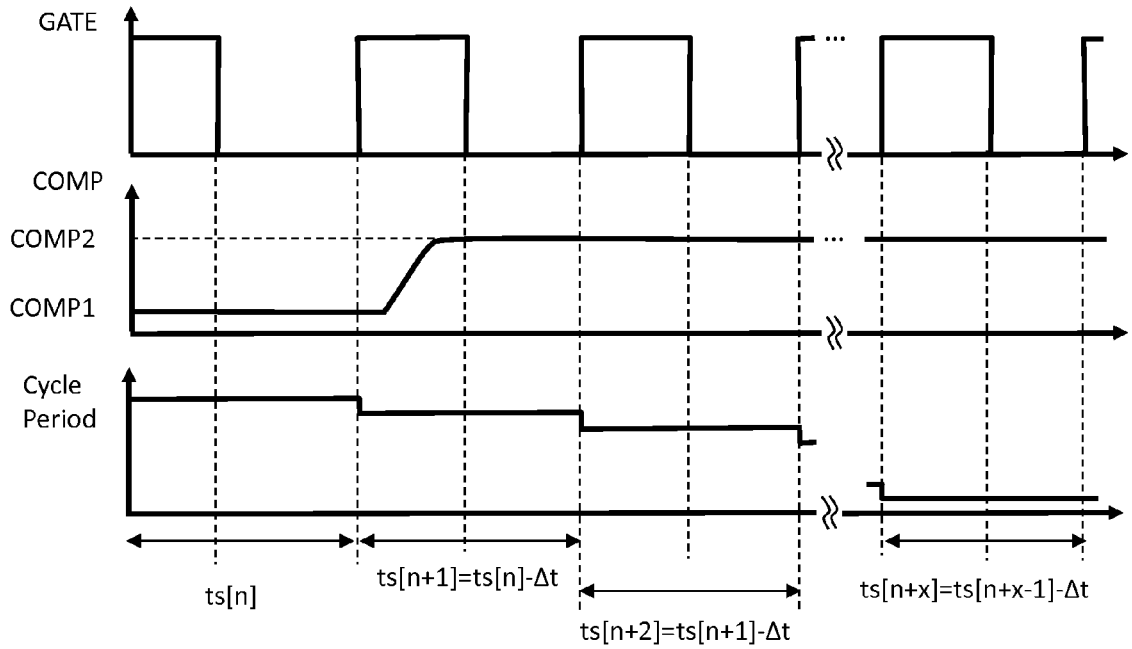

Please refer to FIGS. 2A and 2B for a first embodiment according to the present invention. As shown in FIG. 2A, a flyback converter 200 includes the transformer circuit 102, the power switch circuit 103, a primary side control circuit 205 which is different from the prior art in that it has a transient protection function, the current sense circuit 106, the synchronous rectification (SR) control circuit 107, and the synchronous rectification (SR) switch circuit 108. As shown in FIG. 2A, the rectifier circuit 101 rectifies the AC voltage Vac to generate the input voltage Vin. The rectifier circuit 101 is for example a bridge rectifier circuit. The transformer circuit 102 of the flyback converter 200 receives the input voltage Vin, and converts it to the output voltage Vout. The primary side control circuit 205 generates an operation signal GATE according to the current sense signal CS generated by the current sense circuit 106 and the feedback signal COMP generated by an opto-coupler circuit 104, for controlling a power switch SW of the power switch circuit 103 to convert the input voltage Vin to the output voltage Vout. The transformer circuit 102 includes a primary winding W1 and a secondary winding W2. The secondary winding W2 is electrically connected to the ground level GND, and the primary winding W1 is electrically connected to the reference level REF. The current sense circuit 106 generates the current sense signal CS according to a power switch current flowing through the power switch SW of the power switch circuit 103.

This embodiment is different from the prior art flyback converter 100 at least in that, as shown in FIG. 2B, when the feedback signal COMP changes from a level COMP1 to a higher level COMP2, indicating that a difference between a target output voltage and an actual output voltage increases, the primary side control circuit 205 increases an operation frequency of the operation signal GATE by step-wisely reducing a cycle period of the operation signal GATE in response to the increase of the difference, wherein the cycle period of the operation signal GATE is reduced by a predetermined unit of time $\Delta t$ in each step, such that the cycle period of the operation signal GATE is a step function of the increase of the difference. In a preferable embodiment, the predetermined unit of time $\Delta t$ is a constant. In another embodiment, the predetermined unit of time $\Delta t$ is adjustable.

As shown in FIG. 2B, the cycle period of the operation signal GATE is reduced from a period is [n] to a period is [n+1], ts[n+2], ..., till ts[n+x], by the predetermined unit of time $\Delta t$ in each step (i.e., each cycle period of the operation signal GATE is shorter than the immediately previous cycle period by $\Delta t$). Preferably, the predetermined unit of time $\Delta t$ is not longer than the dead time (the dead time is a minimum time from when the SR switch is forced OFF to an end of the cycle period of the operation signal, as referring to FIG. 1C).

Figure 3:
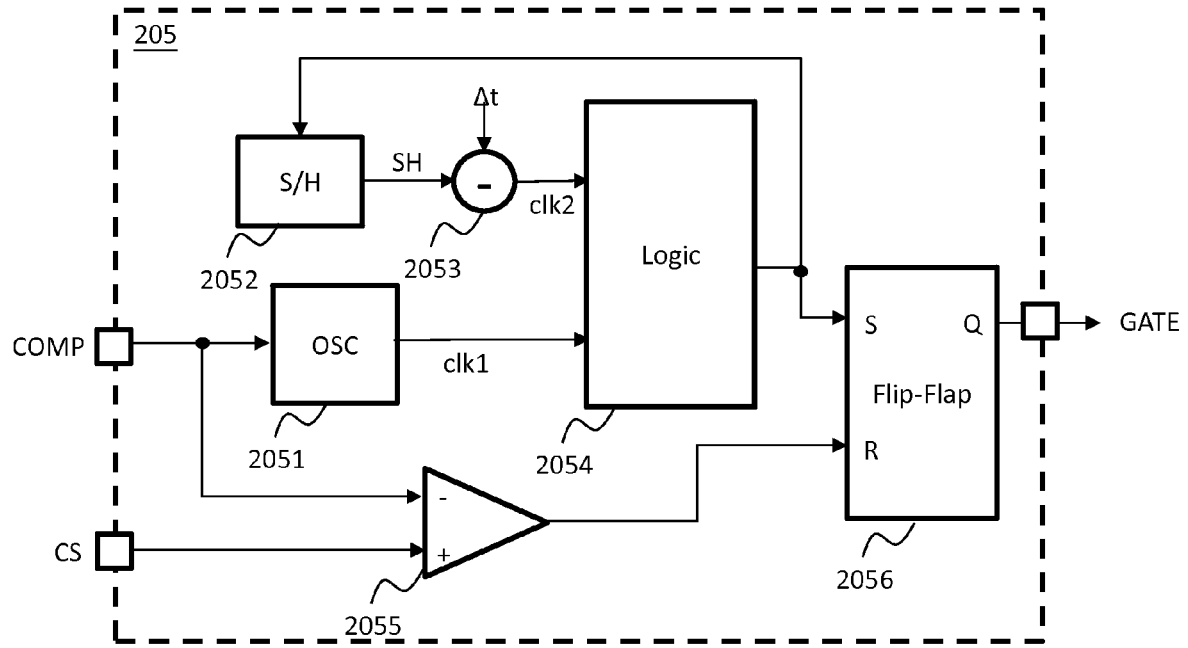
FIG. 3 shows a second embodiment of the present invention.

Please refer to FIG. 3 for a second embodiment according to the present invention. This embodiment shows a more specific embodiment of the primary side control circuit 205. As shown in FIG. 3, the primary side control circuit 205 includes: an oscillator circuit 2051, a sample-and-hold circuit 2052, a subtract circuit 2053, a logic circuit 2054, a comparison circuit 2055, and a flip-flop circuit 2056.

More specifically, the oscillator circuit 2051 is coupled to the SR control circuit, for generating a first clock signal clk1 according to the feedback signal COMP. The oscillator circuit 2051 is for example but not limited to a voltage-controlled oscillator, and a frequency of the first clock signal clk1 is determined by the feedback signal COMP. When the feedback signal COMP increases, the frequency of the first clock signal clk1 increases. The sample-and-hold circuit 2052 is for generating a sample-and-hold signal SH according to a setting signal S. In this embodiment, the sample-and-hold signal SH is obtained by sampling and holding the setting signal S from a rising edge to a next rising edge. The subtract circuit 2053 is coupled to the sample-and-hold circuit 2052, for generating a second clock signal clk2 by subtracting the predetermined unit of time $\Delta t$ from the cycle period of the sample-and-hold signal SH. The logic circuit 2054 is coupled to the oscillator circuit 2051 and the subtract circuit 2053, for generating the setting signal S according to the first clock signal clk1 and the second clock signal clk2. The logic circuit 2054 generates the setting signal S in such a way that a timing of the setting signal switching from an inactive level to an active level (from low level to high level, in this embodiment) is determined by one of the first clock signal clk1 and the second clock signal clk2 which has a longer cycle period than the other. Therefore, when the flyback converter 200 is operating at a steady state, the cycle period is unchanged. On the other hand, during a transient period wherein the frequency is increased, the cycle period will not be shortened to an extent to cause a system crash. An example as to how the logic circuit 2054 does so will be illustrated later with reference to FIG. 4.

The comparison circuit 2055 is for comparing the current sense signal CS with the feedback signal COMP, to generate the resetting signal R. The flip-flop circuit 2056 is coupled to the logic circuit 2054 and the comparison circuit 2055, for generating the operation signal GATE according to the setting signal S and the resetting signal R. If required, a driver gate or a level shift circuit can be provided to process the operation signal GATE so that the operation signal GATE has an adequate level or amplitude to control the power switch SW.

Figure 4:
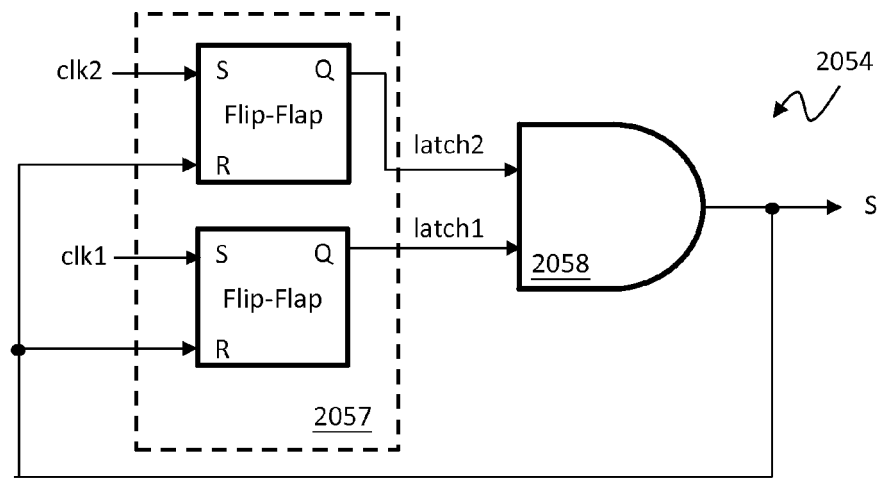
FIG. 4 show a third embodiment of the present invention.

FIG. 4 shows a third embodiment of the present invention. As shown in FIG. 4, the logic circuit 2054 includes a latch circuit 2057 and an AND gate logic circuit 2058. The latch circuit 2057 is coupled to the oscillator circuit 2051 and the subtract circuit 2053, for generating a first latch signal latch1 according to the first clock signal clk1 and a second latch signal latch2 according to the second clock signal clk2, respectively. The AND gate logic circuit 2058 is coupled to the latch circuit 2057, for performing an AND logic operation of the first latch signal latch1 and the second latch signal latch2 to generate the setting signal S.

More specifically, the first latch signal latch1 goes high at the rising edge of the first clock signal clk1, and the second latch signal latch2 goes high at the rising edge of the second clock signal clk2 (assuming that high level means active). The first clock signal clk1 has a frequency determined by the oscillator circuit 2051 according to the feedback signal COMP, which corresponds to a cycle period of the operation signal GATE that is desired to reach, for regulating the output voltage Vout to a target output voltage. The second clock signal clk2 has a frequency that has a corresponding cycle period, which is equal to the cycle period of a previous setting signal S minus one predetermine unit of time Lt. When the flyback converter 200 is operating at a steady state, the cycle period corresponding to the first clock signal clk1 is longer than the cycle period corresponding to the second clock signal clk2. The second clock signal clk2 has a faster frequency, so the second latch signal latch2 goes high earlier than the first latch signal latch1, but the AND gate logic circuit 2058 performs an AND logic operation on the first latch signal latch1 and the second latch signal latch2, so the setting signal S does not go high, unless both the first latch signal latch1 and the second latch signal latch2 go high. Therefore, when the flyback converter 200 is operating at a steady state, the timing when the setting signal switches from low to high is determined by the first latch signal latch1, which corresponds to the first clock signal clk1.

Figure 1A:
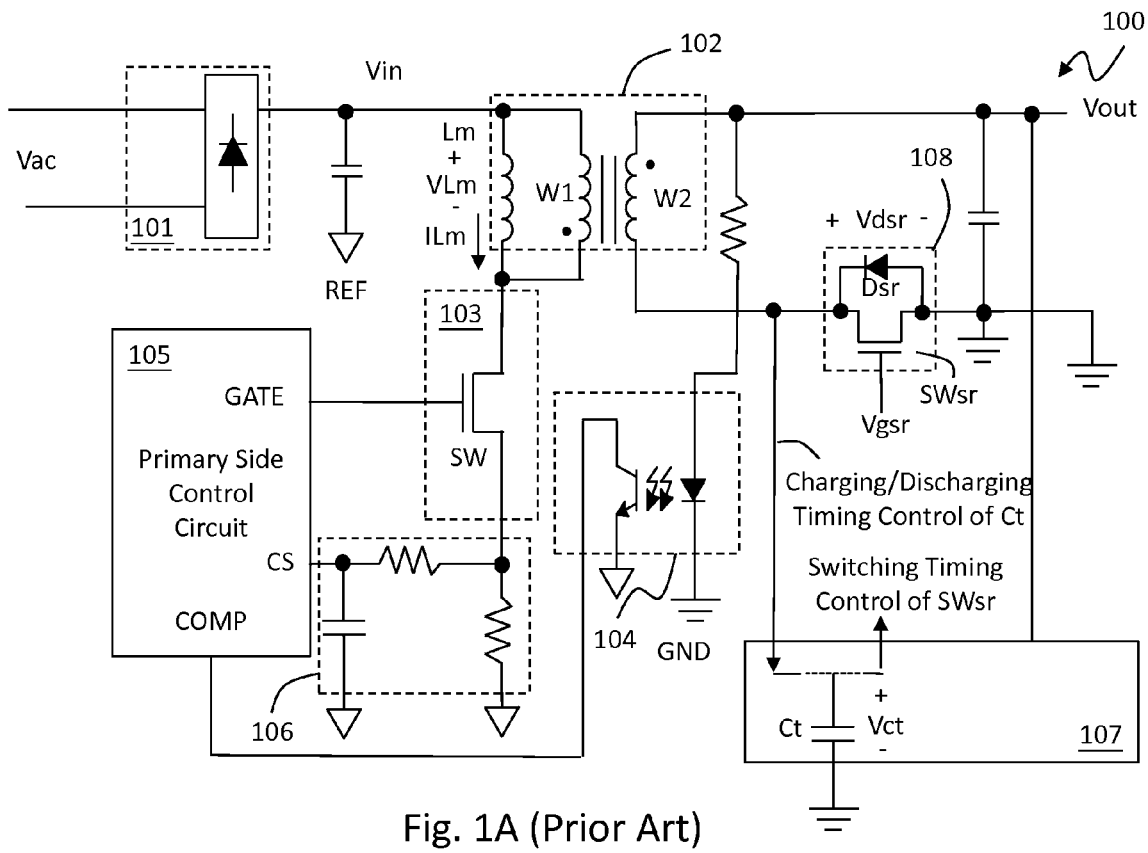
FIGS. 1A-1C show schematic diagrams of a conventional flyback converter 100, signal waveforms showing a synchronous rectification mechanism, and signal waveforms showing a phase-locked loop (PLL) protection mechanism respectively.
Figure 1B:
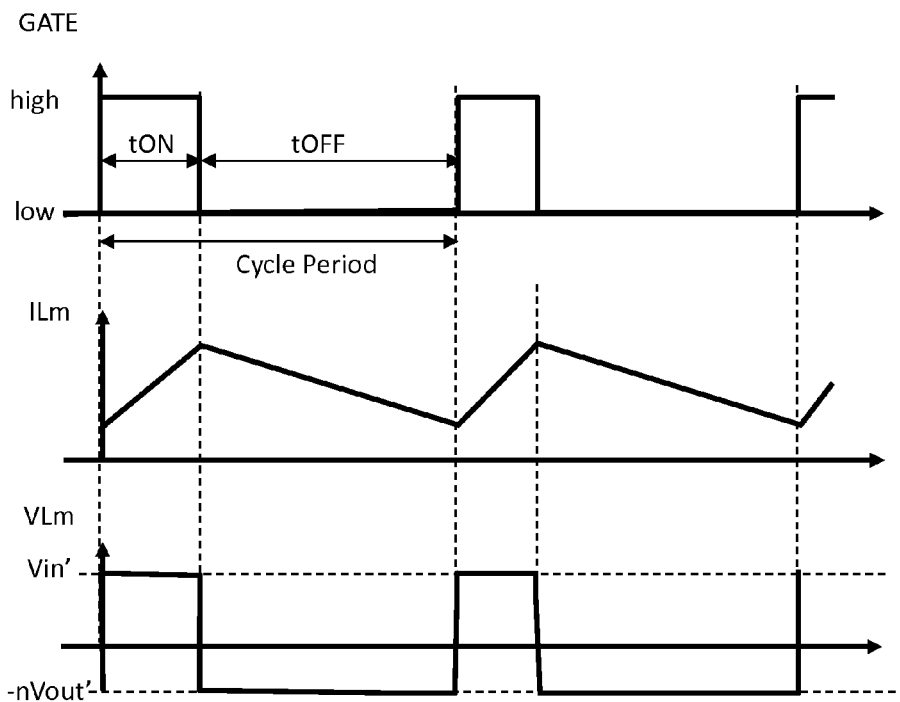
Figure 1C:
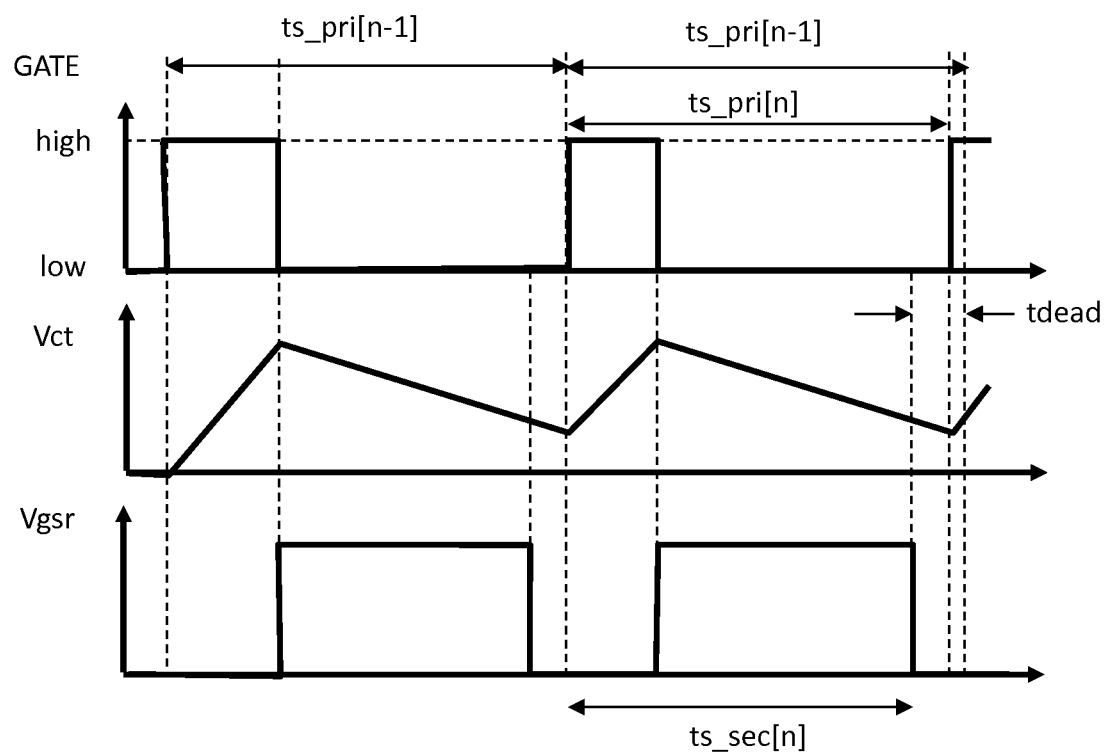

On the other hand, during a transient period wherein the frequency is increased, if the cycle period of the operation signal GATE that is desired to reach, is too short that there is a risk to cause a system crash (e.g., shorter than the period ts_sec[n] as shown in FIG. 1C), by properly setting the predetermine unit of time $\Delta t$, the cycle period corresponding to the second clock signal clk2 will be longer than the cycle period corresponding to the first clock signal clk1. Hence, although the first latch signal latch1 goes high earlier than the second latch signal latch2, because of the AND logic operation performed by the AND gate logic circuit 2058, the setting signal S goes high when the second latch signal latch2 go high. Therefore, when the flyback converter 200 is operating during a transient period wherein the frequency is increased, the timing when the setting signal switches from low to high is determined by the second latch signal latch2, which corresponds to the second clock signal clk2. In the transient period, the operation frequency of the operation signal GATE increases step-wisely (i.e., the cycle period of the operation signal GATE is shortened by Δt in each step), until the desired cycle period is reached.

In this embodiment, an AND logic operation is performed. However, this is only one among many possible embodiments, to achieve the purpose to determine the timing of the setting signal by the longer one of the first clock signal clk1 and the second clock signal clk2. One skilled in this art can readily conceive many equivalents in light of the teaching by the present invention. For example, the same purpose can be achieved by using a multiplexer, and when one of the first clock signal clk1 and the second clock signal clk2 goes high, the multiplexer selects the other. Or, for another example, there can be counters counting and outputting the longer cycle period of the first clock signal clk1 and the second clock signal clk2. These examples are not as simple and neat as the embodiment shown in FIG. 4, but are still within the scope of the present invention. And, if the meanings of high and low levels of any signal is interchanged, the AND logic operation should be certainly be replaced by a corresponding logic operation.

When the feedback signal COMP indicates that the target output voltage is lower than the actual output voltage, because there is no risk to cause a system crash, the primary side control circuit 205 can reduce the operation frequency of the operation signal GATE directly to a target frequency, and it is not required to increase the cycle period of the operation signal GATE step-wisely (although, to increase the cycle period of the operation signal GATE step-wisely is also doable).

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the meanings of high and low levels of a digital signal are interchangeable, with corresponding modifications to the circuits processing this signal or controlled by this signal. For another example, the flip-flap circuit is not limited to an SR flip-flop circuit, but it may be another type of flip-flop circuit. In view of the foregoing, the spirit of the present invention should cover all such and other modifications and variations, which should be interpreted to fall within the scope of the following claims and their equivalents.

What is claimed is:

1. A flyback converter, comprising:
   a transformer circuit, which includes:
      a primary winding, configured to operably receive an input voltage; and
      a secondary winding, configured to operably generate an output voltage at an output node, and to operably generate a synchronous voltage at a synchronous node;
   a power switch circuit, which is coupled to the primary winding, and configured to operably control a power switch therein according to an operation signal, so as to convert the input voltage to the output voltage;
   a primary side control circuit, which is coupled to the power switch circuit, and configured to operably generate the operation signal according to a current sense signal and a feedback signal, wherein the current sense signal is related to a current flowing through the power switch;
   a synchronous rectification (SR) switch, which is coupled to the secondary winding, and controlled by a synchronous rectification (SR) signal; and
   a synchronous rectification (SR) control circuit, which is coupled to the secondary winding and the SR switch, and configured to operably generate the feedback signal according to the output voltage and to operably generate the SR signal and the synchronous voltage, respectively;
   wherein when the feedback signal indicates that a difference between a target output voltage and an actual output voltage increases, the primary side control circuit increases an operation frequency of the operation signal by step-wisely reducing a cycle period of the operation signal in response to the increase of the difference, wherein the cycle period of the operation signal is reduced by a predetermined unit of time in each step, such that the cycle period of the operation signal is a step function of the increase of the difference.

2. The flyback converter of claim 1, wherein the primary side control circuit includes:
   an oscillator circuit, which is coupled to the SR control circuit, and configured to operably generate a first clock signal according to the feedback signal;
   a sample-and-hold circuit, which is configured to operably generate a sample-and-hold signal according to a setting signal;
   a subtract circuit, which is coupled to the sample-and-hold circuit, and configured to operably generate a second clock signal by subtracting the predetermined unit of time from the cycle period of the sample-and-hold signal; and
   a logic circuit, which is coupled to the oscillator circuit and the subtract circuit, and configured to operably generate the setting signal according to the first clock signal and the second clock signal, whereby a timing of the setting signal switching from an inactive level to an active level is determined by one of the first clock signal and the second clock signal which has a longer cycle period than the other;
   wherein a starting time of the cycle period of the operation signal is determined according to the setting signal.

3. The flyback converter of claim 2, wherein the primary side control circuit further includes:
   a comparison circuit, which is configured to operably compare the current sense signal with the feedback signal to generate a resetting signal; and
   a flip-flop circuit, which is coupled to the logic circuit and the comparison circuit, and configured to operably generate the operation signal according to the setting signal and the resetting signal.

4. The flyback converter of claim 2, wherein the sample-and-hold signal is generated by sampling-and-holding the setting signal from a rising edge to a next rising edge.

5. The flyback converter of claim 2, wherein the sample-and-hold circuit includes:
   a latch circuit, which is coupled to the oscillator circuit and the subtract circuit, and configured to operably generate a first latch signal according to the first clock signal and a second latch signal according to the second clock signal, respectively; and a logic operation circuit, which is coupled to the latch circuit, and configured to operably perform a logic operation of the first latch signal and the second latch signal to generate the setting signal.

6. The flyback converter of claim 1, wherein a dead time is set, the dead time being a minimum time from when the SR switch is forced OFF to an end of the cycle period of the operation signal, and wherein the predetermined unit of time is not longer than the dead time.

7. A primary side control circuit in a flyback converter, wherein the flyback converter includes: a transformer circuit, which includes: a primary winding, configured to operably receive an input voltage; and a secondary winding, configured to operably generate an output voltage at an output node, and a synchronous voltage at a synchronous node; a power switch circuit, which is coupled to the primary winding, and configured to operably control a power switch therein according to an operation signal, so as to convert the input voltage to the output voltage; the primary side control circuit, which is coupled to the power switch circuit, and configured to operably generate the operation signal according to a current sense signal and a feedback signal, wherein the current sense signal is related to a current flowing through the power switch; a synchronous rectification (SR) switch, which is coupled to the secondary winding, and controlled by a synchronous rectification (SR) signal; and a synchronous rectification (SR) control circuit, which is coupled to the secondary winding and the SR switch, and configured to operably generate the feedback signal according to the output voltage and to operably generate the SR signal and the synchronous voltage, respectively; wherein when the feedback signal indicates that a difference between a target output voltage and an actual output voltage increases, the primary side control circuit increases an operation frequency of the operation signal by step-wisely reducing a cycle period of the operation signal in response to the increase of the difference, wherein the cycle period of the operation signal is reduced by a predetermined unit of time in each step, such that the cycle period of the operation signal is a step function of the increase of the difference; the primary side control circuit comprising:

an oscillator circuit, which is coupled to the SR control circuit, and configured to operably generate a first clock signal according to the feedback signal;

a sample-and-hold circuit, which is configured to operably generate a sample-and-hold signal according to a setting signal;

a subtract circuit, which is coupled to the sample-and-hold circuit, and configured to operably generate a second clock signal by subtracting the predetermined unit of time from the cycle period of the sample-and-hold signal; and a logic circuit, which is coupled to the oscillator circuit and the subtract circuit, and configured to operably generate the setting signal according to the first clock signal and the second clock signal, whereby a timing of the setting signal switching from an inactive level to an active level is determined by one of the first clock signal and the second clock signal which has a longer cycle period than the other;

wherein a starting time of the cycle period of the operation signal is determined according to the setting signal.

8. The primary side control circuit of claim 7, further comprising:

a comparison circuit, which is configured to operably compare the current sense signal with the feedback signal to generate a resetting signal; and a flip-flop circuit, which is coupled to the logic circuit and the comparison circuit, and configured to operably generate the operation signal according to the setting signal and the resetting signal.

9. The primary side control circuit of claim 7, wherein the sample-and-hold signal is generated by sampling-and-holding the setting signal from a rising edge to a next rising edge.

10. The primary side control circuit of claim 7, wherein the oscillator circuit includes a voltage-controlled oscillator.

11. The primary side control circuit of claim 7, wherein the logic circuit includes:

a latch circuit, which is coupled to the oscillator circuit and the subtract circuit, and configured to operably generate a first latch signal according to the first clock signal and a second latch signal according to the second clock signal, respectively; and a logic operation circuit, which is coupled to the latch circuit, and configured to operably perform a logic operation of the first latch signal and the second latch signal to generate the setting signal.

12. The primary side control circuit of claim 7, wherein a dead time is set, the dead time being a minimum time from when the SR switch is forced OFF to an end of the cycle period of the operation signal, and wherein the predetermined unit of time is not longer than the dead time.

13. A control method of a flyback converter, the control method comprising:

controlling a power switch according to an operation signal, to convert an input voltage to an output voltage;

generating the operation signal according to a current sense signal and a feedback signal, wherein the current sense signal is related to a current flowing through the power switch;

operating a synchronous rectification (SR) switch according to a synchronous rectification (SR) signal;

generating the feedback signal according to the output voltage;

generating the synchronous voltage according to the SR signal; and when the feedback signal indicates that a difference between a target output voltage and an actual output voltage increases, increasing an operation frequency of the operation signal by step-wisely reducing a cycle period of the operation signal in response to the increase of the difference, wherein the cycle period of the operation signal is reduced by a predetermined unit of time in each step, such that the cycle period of the operation signal is a step function of the increase of the difference.

14. The control method of claim 13, wherein the step of generating the operation signal according to a current sense signal and a feedback signal, includes:

generating a first clock signal according to the feedback signal;

generating a sample-and-hold signal according to a setting signal;

generating a second clock signal by subtracting the predetermined unit of time from the cycle period of the sample-and-hold signal;

generating the setting signal according to the first clock signal and the second clock signal, whereby a timing of the setting signal switching from an inactive level to an active level is determined by one of the first clock signal and the second clock signal which has a longer cycle period than the other; and determining a starting time of the cycle period of the operation signal according to the setting signal.

15. The control method of claim 14, wherein the step of generating the operation signal according to a current sense signal and a feedback signal, further includes:

comparing the current sense signal with the feedback signal to generate a resetting signal; and generating the operation signal according to the setting signal and the resetting signal.

16. The control method of claim 14, wherein the step of generating the sample-and-hold signal includes: sampling-and-holding the setting signal from a rising edge to a next rising edge to generate the sample-and-hold signal.

17. The control method of claim 14, wherein the step of generating the setting signal includes:

generating a first latch signal according to the first clock signal and generating a second latch signal according to the second clock signal, respectively; and performing a logic operation of the first latch signal and the second latch signal to generate the setting signal.

18. The control method of claim 13, wherein a dead time is set, the dead time being a minimum time from when the SR switch is forced OFF to an end of the cycle period of the operation signal, and wherein the predetermined unit of time is not longer than the dead time.

\* \* \* \* \*